United States Patent
Sheu et al.

(10) Patent No.: US 9,092,610 B2
(45) Date of Patent: Jul. 28, 2015

(54) KEY ASSIGNMENT FOR A BRAND

(75) Inventors: Ming-Jye Sheu, San Jose, CA (US); Prashant Ranade, San Jose, CA (US)

(73) Assignee: Ruckus Wireless, Inc., Sunnyvale, CA (US)

( * ) Notice: Subject to any disclaimer, the term of this patent is extended or adjusted under 35 U.S.C. 154(b) by 0 days.

(21) Appl. No.: 13/439,844

(22) Filed: Apr. 4, 2012

(65) Prior Publication Data

US 2013/0269008 A1 Oct. 10, 2013

(51) Int. Cl.
*G06F 17/30* (2006.01)
*G06F 21/44* (2013.01)
*H04W 12/04* (2009.01)
*H04W 12/06* (2009.01)
*G06F 7/04* (2006.01)

(52) U.S. Cl.
CPC .............. *G06F 21/44* (2013.01); *H04W 12/04* (2013.01); *H04W 12/06* (2013.01)

(58) Field of Classification Search
CPC ... H04L 63/065; H04L 63/062; H04L 63/083; H04W 12/04
USPC ............................................................ 726/6
See application file for complete search history.

(56) References Cited

U.S. PATENT DOCUMENTS

| 725,605 | A | 4/1903 | Tesla |
| 1,869,659 | A | 8/1932 | Broertjes |
| 2,292,387 | A | 8/1942 | Markey et al. |
| 3,488,445 | A | 1/1970 | Chang |
| 3,568,105 | A | 3/1971 | Felsenheld |
| 3,721,990 | A | 3/1973 | Gibson et al. |
| 3,887,925 | A | 6/1975 | Ranghelli |
| 3,967,067 | A | 6/1976 | Potter |
| 3,969,730 | A | 7/1976 | Fuchser |
| 3,982,214 | A | 9/1976 | Burns |
| 3,991,273 | A | 11/1976 | Mathes |
| 4,001,734 | A | 1/1977 | Burns |
| 4,027,307 | A | 5/1977 | Litchford |
| 4,176,356 | A | 11/1979 | Foster |
| 4,193,077 | A | 3/1980 | Greenberg |

(Continued)

FOREIGN PATENT DOCUMENTS

| AU | 2003/227399 | 10/2003 |
| CA | 02494982 | 10/2003 |

(Continued)

OTHER PUBLICATIONS

*Ruckus Wireless, Inc.* vs. *Netgear, Inc*; Defendant Netgear, Inc. Invalidity Contentions.

(Continued)

*Primary Examiner* — Ashok Patel
*Assistant Examiner* — Gary Gracia
(74) *Attorney, Agent, or Firm* — Lewis Roca Rothgerber LLP

(57) ABSTRACT

Systems and methods for providing secured network access are provided. A user device located within range of a branded hotspot initiates a request for the secured network access. The request concerns secured network access at the hotspot by the user device and includes a unique pre-shared key. A query regarding the unique pre-shared key is sent to a database, which retrieves information regarding a corresponding pre-shared key. That information is sent to the hotspot controller, which allows the user device secured network access as governed by one or more parameters associated with the pre-shared key.

17 Claims, 2 Drawing Sheets

(56) References Cited

U.S. PATENT DOCUMENTS

| | | | |
|---|---|---|---|
| 4,203,118 A | 5/1980 | Alford |
| 4,253,193 A | 2/1981 | Kennard |
| 4,305,052 A | 12/1981 | Baril |
| 4,513,412 A | 4/1985 | Cox |
| 4,554,554 A | 11/1985 | Olesen et al. |
| 4,733,203 A | 3/1988 | Ayasli |
| 4,764,773 A | 8/1988 | Larsen et al. |
| 4,800,393 A | 1/1989 | Edward et al. |
| 4,814,777 A | 3/1989 | Monser |
| 4,821,040 A | 4/1989 | Johnson et al. |
| 4,920,285 A | 4/1990 | Clark et al. |
| 4,937,585 A | 6/1990 | Shoemaker |
| 5,063,574 A | 11/1991 | Moose |
| 5,097,484 A | 3/1992 | Akaiwa |
| 5,173,711 A | 12/1992 | Takeuchi |
| 5,203,010 A | 4/1993 | Felix |
| 5,208,564 A | 5/1993 | Burns et al. |
| 5,220,340 A | 6/1993 | Shafai |
| 5,241,693 A | 8/1993 | Kim |
| 5,282,222 A | 1/1994 | Fattouche et al. |
| 5,291,289 A | 3/1994 | Hulyalkar et al. |
| 5,311,550 A | 5/1994 | Fouche et al. |
| 5,373,548 A | 12/1994 | McCarthy |
| 5,434,575 A | 7/1995 | Jelinek |
| 5,453,752 A | 9/1995 | Wang et al. |
| 5,479,176 A | 12/1995 | Zavrel |
| 5,507,035 A | 4/1996 | Bantz |
| 5,532,708 A | 7/1996 | Krenz et al. |
| 5,559,800 A | 9/1996 | Mousseau |
| 5,726,666 A | 3/1998 | Hoover et al. |
| 5,754,145 A | 5/1998 | Evans |
| 5,767,755 A | 6/1998 | Kim et al. |
| 5,767,807 A | 6/1998 | Prtichett |
| 5,767,809 A | 6/1998 | Chuang |
| 5,786,793 A | 7/1998 | Maeda et al. |
| 5,802,312 A | 9/1998 | Lazaridis |
| 5,828,346 A | 10/1998 | Park |
| 5,936,595 A | 8/1999 | Wang |
| 5,964,830 A | 10/1999 | Durrett |
| 5,990,838 A | 11/1999 | Burns et al. |
| 6,005,525 A | 12/1999 | Kivela |
| 6,011,450 A | 1/2000 | Miya |
| 6,023,250 A | 2/2000 | Cronyn |
| 6,031,503 A | 2/2000 | Preiss, II et al. |
| 6,034,638 A | 3/2000 | Thiel |
| 6,046,703 A | 4/2000 | Wang |
| 6,052,093 A | 4/2000 | Yao et al. |
| 6,091,364 A | 7/2000 | Murakami et al. |
| 6,094,177 A | 7/2000 | Yamamoto |
| 6,097,347 A | 8/2000 | Duan et al. |
| 6,104,356 A | 8/2000 | Hikuma et al. |
| 6,169,523 B1 | 1/2001 | Ploussios |
| 6,249,216 B1 | 6/2001 | Flick |
| 6,266,528 B1 | 7/2001 | Farzaneh |
| 6,281,762 B1 | 8/2001 | Nakao |
| 6,288,682 B1 | 9/2001 | Thiel et al. |
| 6,292,153 B1 | 9/2001 | Aiello |
| 6,307,524 B1 | 10/2001 | Britain |
| 6,317,599 B1 | 11/2001 | Rappaport |
| 6,323,810 B1 | 11/2001 | Poilasne et al. |
| 6,326,922 B1 | 12/2001 | Hegendoerfer |
| 6,326,924 B1 | 12/2001 | Muramoto et al. |
| 6,337,628 B2 | 1/2002 | Campana |
| 6,337,668 B1 | 1/2002 | Ito |
| 6,339,404 B1 | 1/2002 | Johnson |
| 6,345,043 B1 | 2/2002 | Hsu |
| 6,351,240 B1 | 2/2002 | Karimullah et al. |
| 6,356,242 B1 | 3/2002 | Ploussios |
| 6,356,243 B1 | 3/2002 | Schneider |
| 6,356,905 B1 | 3/2002 | Gershman |
| 6,366,254 B1 | 4/2002 | Sivenpiper |
| 6,377,227 B1 | 4/2002 | Zhu |
| 6,392,610 B1 | 5/2002 | Braun |
| 6,396,456 B1 | 5/2002 | Chiang et al. |
| 6,400,329 B1 | 6/2002 | Barnes |
| 6,404,386 B1 | 6/2002 | Proctor |
| 6,407,719 B1 | 6/2002 | Ohira |
| RE37,802 E | 7/2002 | Fattouche et al. |
| 6,414,647 B1 | 7/2002 | Lee |
| 6,424,311 B1 | 7/2002 | Tsai et al. |
| 6,442,507 B1 | 8/2002 | Skidmore |
| 6,445,688 B1 | 9/2002 | Garces |
| 6,456,242 B1 | 9/2002 | Crawford |
| 6,476,773 B2 | 11/2002 | Palmer |
| 6,492,957 B2 | 12/2002 | Carillo et al. |
| 6,493,679 B1 | 12/2002 | Rappaport |
| 6,496,083 B1 | 12/2002 | Kushitani et al. |
| 6,498,589 B1 | 12/2002 | Horii |
| 6,499,006 B1 | 12/2002 | Rappaport |
| 6,507,321 B2 | 1/2003 | Oberschmidt |
| 6,521,422 B1 | 2/2003 | Hsu |
| 6,531,985 B1 | 3/2003 | Jones et al. |
| 6,545,643 B1 | 4/2003 | Sward |
| 6,583,765 B1 | 6/2003 | Schamberget et al. |
| 6,586,786 B2 | 7/2003 | Kitazawa et al. |
| 6,593,891 B2 | 7/2003 | Zhang |
| 6,606,059 B1 | 8/2003 | Barabash |
| 6,611,230 B2 | 8/2003 | Phelan |
| 6,621,029 B2 | 9/2003 | Galmiche |
| 6,625,454 B1 | 9/2003 | Rappaport |
| 6,633,206 B1 | 10/2003 | Kato |
| 6,642,889 B1 | 11/2003 | McGrath |
| 6,642,890 B1 | 11/2003 | Chen |
| 6,674,459 B2 | 1/2004 | Ben-Shachar |
| 6,700,546 B2 | 3/2004 | Benhammou et al. |
| 6,701,522 B1 | 3/2004 | Rubin |
| 6,724,346 B2 | 4/2004 | Le Bolzer |
| 6,725,281 B1 | 4/2004 | Zintel |
| 6,741,219 B2 | 5/2004 | Shor |
| 6,747,605 B2 | 6/2004 | Lebaric |
| 6,753,814 B2 | 6/2004 | Killen |
| 6,757,267 B1 | 6/2004 | Evans |
| 6,762,723 B2 | 7/2004 | Nallo |
| 6,772,331 B1 | 8/2004 | Hind et al. |
| 6,774,852 B2 | 8/2004 | Chiang et al. |
| 6,774,864 B2 | 8/2004 | Evans |
| 6,779,004 B1 | 8/2004 | Zintel |
| 6,807,577 B1 | 10/2004 | Gillespie |
| 6,819,287 B2 | 11/2004 | Sullivan |
| 6,839,038 B2 | 1/2005 | Weinstein |
| 6,859,176 B2 | 2/2005 | Choi |
| 6,859,182 B2 | 2/2005 | Horii |
| 6,864,852 B2 | 3/2005 | Chiang et al. |
| 6,876,280 B2 | 4/2005 | Nakano |
| 6,876,836 B2 | 4/2005 | Lin |
| 6,879,293 B2 | 4/2005 | Sato |
| 6,888,504 B2 | 5/2005 | Chiang |
| 6,888,893 B2 | 5/2005 | Li |
| 6,892,230 B1 | 5/2005 | Gu |
| 6,894,653 B2 | 5/2005 | Chiang et al. |
| 6,903,686 B2 | 6/2005 | Vance et al. |
| 6,906,678 B2 | 6/2005 | Chen |
| 6,910,068 B2 | 6/2005 | Zintel |
| 6,914,581 B1 | 7/2005 | Popek |
| 6,924,768 B2 | 8/2005 | Wu |
| 6,931,429 B2 | 8/2005 | Gouge |
| 6,933,907 B2 | 8/2005 | Shirosaka |
| 6,941,143 B2 | 9/2005 | Mathur |
| 6,943,749 B2 | 9/2005 | Paun |
| 6,947,727 B1 | 9/2005 | Brynielsson |
| 6,950,019 B2 | 9/2005 | Bellone |
| 6,950,069 B2 | 9/2005 | Gaucher et al. |
| 6,950,523 B1 | 9/2005 | Brickell |
| 6,961,028 B2 | 11/2005 | Joy |
| 6,965,353 B2 | 11/2005 | Shirosaka et al. |
| 6,973,622 B1 | 12/2005 | Rappaport |
| 6,975,834 B1 | 12/2005 | Forster |
| 6,980,782 B1 | 12/2005 | Braun et al. |
| 7,023,909 B1 | 4/2006 | Adams et al. |
| 7,024,225 B2 | 4/2006 | Ito |
| 7,034,769 B2 | 4/2006 | Surducan et al. |
| 7,034,770 B2 | 4/2006 | Yang |
| 7,043,277 B1 | 5/2006 | Pfister |
| 7,043,633 B1 | 5/2006 | Fink et al. |

(56) References Cited

U.S. PATENT DOCUMENTS

| | | | |
|---|---|---|---|
| 7,046,201 B2 | 5/2006 | Okada |
| 7,050,809 B2 | 5/2006 | Lim |
| 7,053,844 B2 | 5/2006 | Gaucher et al. |
| 7,064,717 B2 | 6/2006 | Kaluzni |
| 7,085,814 B1 | 8/2006 | Ghandi |
| 7,088,299 B2 | 8/2006 | Siegler et al. |
| 7,088,306 B2 | 8/2006 | Chiang et al. |
| 7,089,307 B2 | 8/2006 | Zintel |
| 7,098,863 B2 | 8/2006 | Bancroft |
| D530,325 S | 10/2006 | Kerila |
| 7,120,405 B2 | 10/2006 | Rofougaran |
| 7,127,234 B2 | 10/2006 | Ishii |
| 7,130,895 B2 | 10/2006 | Zintel |
| 7,148,846 B2 | 12/2006 | Qi et al. |
| 7,162,273 B1 | 1/2007 | Ambramov et al. |
| 7,164,380 B2 | 1/2007 | Saito |
| 7,171,475 B2 | 1/2007 | Weisman |
| 7,181,620 B1 | 2/2007 | Hur |
| 7,193,562 B2 | 3/2007 | Shtrom |
| 7,197,297 B2 | 3/2007 | Myles |
| 7,206,610 B2 | 4/2007 | Iacono et al. |
| 7,215,296 B2 | 5/2007 | Ambramov et al. |
| 7,234,063 B1 | 6/2007 | Baugher |
| 7,234,156 B2 | 6/2007 | French et al. |
| 7,263,076 B1 | 8/2007 | Leibovitz et al. |
| 7,277,063 B2 | 10/2007 | Shirosaka et al. |
| 7,292,198 B2 | 11/2007 | Shtrom |
| 7,292,870 B2 | 11/2007 | Heredia et al. |
| 7,295,825 B2 | 11/2007 | Raddant |
| 7,298,228 B2 | 11/2007 | Sievenpiper |
| 7,312,762 B2 | 12/2007 | Puente Ballarda et al. |
| 7,319,432 B2 | 1/2008 | Andersson |
| 7,333,460 B2 | 2/2008 | Vaisanen et al. |
| 7,358,912 B1 | 4/2008 | Kish et al. |
| 7,362,280 B2 | 4/2008 | Shtrom |
| 7,363,354 B2 | 4/2008 | Lahti |
| 7,385,563 B2 | 6/2008 | Bishop |
| 7,421,578 B1 | 9/2008 | Huang et al. |
| 7,477,894 B1 | 1/2009 | Sinha |
| 7,498,999 B2 | 3/2009 | Shtrom et al. |
| 7,505,434 B1 | 3/2009 | Backes |
| 7,511,680 B2 | 3/2009 | Shtrom et al. |
| 7,522,569 B2 | 4/2009 | Rada |
| 7,525,486 B2 | 4/2009 | Shtrom |
| 7,562,385 B2 | 7/2009 | Thione et al. |
| 7,565,529 B2 | 7/2009 | Beck |
| 7,599,380 B2 | 10/2009 | Whitten |
| 7,609,648 B2 | 10/2009 | Hoffmann et al. |
| 7,669,232 B2 | 2/2010 | Jou |
| 7,697,550 B2 | 4/2010 | Rada |
| 7,715,833 B2 | 5/2010 | Sanchez |
| 7,722,502 B2 | 5/2010 | Holkkola |
| 7,733,275 B2 | 6/2010 | Hirota |
| 7,782,895 B2 | 8/2010 | Pasanen et al. |
| 7,788,703 B2 | 8/2010 | Jou |
| 7,835,697 B2 | 11/2010 | Wright |
| 7,847,741 B2 | 12/2010 | Hirota |
| 7,864,119 B2 | 1/2011 | Shtrom et al. |
| 7,893,882 B2 | 2/2011 | Shtrom |
| 7,916,463 B2 | 3/2011 | Aya et al. |
| 7,966,497 B2 | 6/2011 | Gantman et al. |
| 8,005,459 B2 | 8/2011 | Balsillie |
| 8,009,644 B2 | 8/2011 | Kuo |
| 8,068,068 B2 | 11/2011 | Kish et al. |
| 8,085,206 B2 | 12/2011 | Shtrom |
| 8,091,120 B2 | 1/2012 | Perrella et al. |
| 8,108,904 B1 | 1/2012 | Chickering et al. |
| 8,217,843 B2 | 7/2012 | Shtrom |
| 8,260,278 B2 | 9/2012 | Landsman et al. |
| 8,272,036 B2 | 9/2012 | Jou |
| 8,355,912 B1 * | 1/2013 | Keesey et al. ............... 704/235 |
| 8,358,248 B2 | 1/2013 | Shtrom |
| 8,605,697 B2 | 12/2013 | Kuo |
| 8,607,315 B2 | 12/2013 | Jou |
| 8,686,905 B2 | 4/2014 | Shtrom |
| 8,704,720 B2 | 4/2014 | Kish |
| 8,723,741 B2 | 5/2014 | Shtrom |
| 8,756,668 B2 | 6/2014 | Ranade et al. |
| 8,836,606 B2 | 9/2014 | Kish |
| 8,923,265 B2 | 12/2014 | Kuo |
| 2001/0046848 A1 | 11/2001 | Kenkel |
| 2002/0009199 A1 | 1/2002 | Ala-Laurila et al. |
| 2002/0022483 A1 | 2/2002 | Thompson et al. |
| 2002/0031130 A1 | 3/2002 | Tsuchiya |
| 2002/0036586 A1 | 3/2002 | Gothard et al. |
| 2002/0047800 A1 | 4/2002 | Proctor |
| 2002/0080767 A1 | 6/2002 | Lee |
| 2002/0084942 A1 | 7/2002 | Tsai |
| 2002/0101377 A1 | 8/2002 | Crawford |
| 2002/0105471 A1 | 8/2002 | Kojima |
| 2002/0112058 A1 | 8/2002 | Weisman |
| 2002/0119757 A1 | 8/2002 | Hamabe |
| 2002/0158798 A1 | 10/2002 | Chang |
| 2002/0169966 A1 | 11/2002 | Nyman |
| 2002/0170064 A1 | 11/2002 | Monroe |
| 2003/0026240 A1 | 2/2003 | Eyuboglu |
| 2003/0030588 A1 | 2/2003 | Kalis |
| 2003/0038698 A1 | 2/2003 | Hirayama |
| 2003/0063591 A1 | 4/2003 | Leung |
| 2003/0122714 A1 | 7/2003 | Wannagot |
| 2003/0156558 A1 | 8/2003 | Cromer et al. |
| 2003/0162533 A1 | 8/2003 | Moles |
| 2003/0169330 A1 | 9/2003 | Ben-Shachar |
| 2003/0184490 A1 | 10/2003 | Raiman |
| 2003/0189514 A1 | 10/2003 | Miyano |
| 2003/0189521 A1 | 10/2003 | Yamamoto |
| 2003/0189523 A1 | 10/2003 | Ojantakanen |
| 2003/0191935 A1 | 10/2003 | Ferguson |
| 2003/0196084 A1 | 10/2003 | Okereke |
| 2003/0202486 A1 | 10/2003 | Anton et al. |
| 2003/0210207 A1 | 11/2003 | Suh |
| 2003/0214446 A1 | 11/2003 | Shehab |
| 2003/0227414 A1 | 12/2003 | Saliga |
| 2004/0014432 A1 | 1/2004 | Boyle |
| 2004/0017310 A1 | 1/2004 | Vargas-Hurlston |
| 2004/0017315 A1 | 1/2004 | Fang et al. |
| 2004/0017860 A1 | 1/2004 | Liu |
| 2004/0027291 A1 | 2/2004 | Zhang |
| 2004/0027304 A1 | 2/2004 | Chiang |
| 2004/0030900 A1 * | 2/2004 | Clark ............................ 713/176 |
| 2004/0032378 A1 | 2/2004 | Volman |
| 2004/0036651 A1 | 2/2004 | Toda |
| 2004/0036654 A1 | 2/2004 | Hsieh |
| 2004/0041732 A1 | 3/2004 | Aikawa |
| 2004/0048593 A1 | 3/2004 | Sano |
| 2004/0058690 A1 | 3/2004 | Ratzel |
| 2004/0061653 A1 | 4/2004 | Webb |
| 2004/0070543 A1 | 4/2004 | Masaki |
| 2004/0073786 A1 | 4/2004 | O'Neill |
| 2004/0075609 A1 | 4/2004 | Li |
| 2004/0080455 A1 | 4/2004 | Lee |
| 2004/0090371 A1 | 5/2004 | Rossman |
| 2004/0095278 A1 | 5/2004 | Kanemoto |
| 2004/0097217 A1 | 5/2004 | McClain |
| 2004/0114535 A1 | 6/2004 | Hoffman |
| 2004/0121749 A1 | 6/2004 | Cui et al. |
| 2004/0125777 A1 | 7/2004 | Doyle |
| 2004/0141617 A1 | 7/2004 | Volpano |
| 2004/0145528 A1 | 7/2004 | Mukai et al. |
| 2004/0153647 A1 * | 8/2004 | Rotholtz et al. ............... 713/176 |
| 2004/0160376 A1 | 8/2004 | Hornsby et al. |
| 2004/0190477 A1 | 9/2004 | Olson |
| 2004/0203347 A1 | 10/2004 | Nguyen |
| 2004/0203593 A1 | 10/2004 | Whelan |
| 2004/0207563 A1 | 10/2004 | Yang |
| 2004/0214570 A1 | 10/2004 | Zhang |
| 2004/0214572 A1 | 10/2004 | Thompson et al. |
| 2004/0227669 A1 | 11/2004 | Okada |
| 2004/0260800 A1 | 12/2004 | Gu |
| 2005/0022210 A1 | 1/2005 | Zintel |
| 2005/0041739 A1 | 2/2005 | Li |
| 2005/0042988 A1 | 2/2005 | Hoek |
| 2005/0048934 A1 | 3/2005 | Rawnick et al. |
| 2005/0050352 A1 * | 3/2005 | Narayanaswami et al. |

(56) References Cited

U.S. PATENT DOCUMENTS

| | | |
|---|---|---|
| 2005/0062649 A1 | 3/2005 | Chiang et al. |
| 2005/0074018 A1 | 4/2005 | Zintel |
| 2005/0097503 A1 | 5/2005 | Zintel |
| 2005/0100166 A1 | 5/2005 | Smetters |
| 2005/0122265 A1 | 6/2005 | Gaucher et al. |
| 2005/0128983 A1 | 6/2005 | Kim et al. |
| 2005/0128988 A1 | 6/2005 | Simpson et al. |
| 2005/0129222 A1 | 6/2005 | Creamer et al. |
| 2005/0135480 A1 | 6/2005 | Li |
| 2005/0138137 A1 | 6/2005 | Encamacion |
| 2005/0138193 A1 | 6/2005 | Encamacion |
| 2005/0146475 A1 | 7/2005 | Bettner et al. |
| 2005/0152305 A1 | 7/2005 | Ji et al. |
| 2005/0165953 A1 | 7/2005 | Oba et al. |
| 2005/0180381 A1 | 8/2005 | Retzer |
| 2005/0188193 A1 | 8/2005 | Kuehnel |
| 2005/0220048 A1 | 10/2005 | Lee et al. |
| 2005/0222933 A1 | 10/2005 | Wesby |
| 2005/0228874 A1 | 10/2005 | Edgett |
| 2005/0237258 A1 | 10/2005 | Abramov et al. |
| 2005/0240665 A1 | 10/2005 | Gu |
| 2005/0250472 A1 | 11/2005 | Silvester |
| 2005/0261970 A1 | 11/2005 | Vucina et al. |
| 2005/0267935 A1 | 12/2005 | Ghandi |
| 2005/0268107 A1 | 12/2005 | Harris |
| 2006/0007897 A1 | 1/2006 | Ishii |
| 2006/0031922 A1 | 2/2006 | Sakai |
| 2006/0038734 A1 | 2/2006 | Shtrom et al. |
| 2006/0046730 A1 | 3/2006 | Briancon et al. |
| 2006/0050005 A1 | 3/2006 | Shirosaka et al. |
| 2006/0052085 A1 | 3/2006 | Gregrio Rodriguez et al. |
| 2006/0080415 A1 | 4/2006 | Tu |
| 2006/0080741 A1 | 4/2006 | Nair |
| 2006/0089123 A1 | 4/2006 | Frank |
| 2006/0094371 A1 | 5/2006 | Nguyen |
| 2006/0094400 A1 | 5/2006 | Beachem et al. |
| 2006/0098607 A1 | 5/2006 | Zeng |
| 2006/0109191 A1 | 5/2006 | Shtrom |
| 2006/0111902 A1* | 5/2006 | Julia et al. ............... 704/236 |
| 2006/0123124 A1 | 6/2006 | Weisman |
| 2006/0123125 A1 | 6/2006 | Weisman |
| 2006/0123455 A1 | 6/2006 | Pai |
| 2006/0133405 A1 | 6/2006 | Fee |
| 2006/0165103 A1 | 7/2006 | Trudeau et al. |
| 2006/0168159 A1 | 7/2006 | Weisman |
| 2006/0184660 A1 | 8/2006 | Rao |
| 2006/0184661 A1 | 8/2006 | Weisman |
| 2006/0184693 A1 | 8/2006 | Rao |
| 2006/0189298 A1 | 8/2006 | Marcelli |
| 2006/0200851 A1 | 9/2006 | Hung |
| 2006/0223527 A1 | 10/2006 | Lee et al. |
| 2006/0224690 A1 | 10/2006 | Falkenburg |
| 2006/0225107 A1 | 10/2006 | Seetharaman |
| 2006/0227062 A1 | 10/2006 | Francque et al. |
| 2006/0227761 A1 | 10/2006 | Scott |
| 2006/0239369 A1 | 10/2006 | Lee |
| 2006/0251256 A1 | 11/2006 | Asokan et al. |
| 2006/0262015 A1 | 11/2006 | Thornell-Pers et al. |
| 2006/0291434 A1 | 12/2006 | Gu |
| 2007/0027622 A1 | 2/2007 | Cleron |
| 2007/0037619 A1 | 2/2007 | Matsunaga et al. |
| 2007/0047449 A1 | 3/2007 | Berger et al. |
| 2007/0055752 A1 | 3/2007 | Wiegand et al. |
| 2007/0115180 A1 | 5/2007 | Kish et al. |
| 2007/0124490 A1* | 5/2007 | Kalavade et al. ........ 709/230 |
| 2007/0130294 A1* | 6/2007 | Nishio ..................... 709/219 |
| 2007/0130456 A1 | 6/2007 | Kuo |
| 2007/0135167 A1 | 6/2007 | Liu |
| 2007/0143832 A1 | 6/2007 | Perrella et al. |
| 2007/0150736 A1 | 6/2007 | Cukier |
| 2007/0165582 A1 | 7/2007 | Batta |
| 2007/0189537 A1 | 8/2007 | Zhang et al. |
| 2007/0199053 A1 | 8/2007 | Sandhu et al. |
| 2007/0211659 A1 | 9/2007 | Li et al. |
| 2007/0249324 A1 | 10/2007 | Jou |
| 2007/0287450 A1 | 12/2007 | Yang |
| 2007/0293951 A1 | 12/2007 | Takahashi |
| 2007/0294528 A1 | 12/2007 | Shoji et al. |
| 2008/0060064 A1* | 3/2008 | Wynn et al. ............... 726/5 |
| 2008/0062058 A1 | 3/2008 | Bishop |
| 2008/0075280 A1 | 3/2008 | Ye et al. |
| 2008/0085723 A1 | 4/2008 | Tsao et al. |
| 2008/0096492 A1 | 4/2008 | Yoon |
| 2008/0109657 A1 | 5/2008 | Bajaj et al. |
| 2008/0119165 A1 | 5/2008 | Mittal et al. |
| 2008/0136715 A1 | 6/2008 | Shtrom |
| 2008/0141244 A1 | 6/2008 | Kelley |
| 2008/0208617 A1 | 8/2008 | Onyon et al. |
| 2008/0212535 A1* | 9/2008 | Karaoguz et al. ......... 370/331 |
| 2008/0272977 A1 | 11/2008 | Gaucher et al. |
| 2008/0307515 A1 | 12/2008 | Drokov et al. |
| 2009/0005005 A1 | 1/2009 | Forstall et al. |
| 2009/0013210 A1 | 1/2009 | McIntosh et al. |
| 2009/0092255 A1 | 4/2009 | Jou |
| 2009/0103731 A1 | 4/2009 | Sarikaya |
| 2009/0119190 A1 | 5/2009 | Realini |
| 2009/0187970 A1 | 7/2009 | Mower et al. |
| 2009/0193118 A1 | 7/2009 | Cox et al. |
| 2009/0217048 A1* | 8/2009 | Smith ........................ 713/176 |
| 2009/0219903 A1 | 9/2009 | Alamouti et al. |
| 2009/0295648 A1 | 12/2009 | Dorsey et al. |
| 2009/0315794 A1 | 12/2009 | Alamouti et al. |
| 2010/0053023 A1 | 3/2010 | Shtrom |
| 2010/0070542 A1 | 3/2010 | Feinsmith |
| 2010/0103065 A1 | 4/2010 | Shtrom et al. |
| 2010/0103066 A1 | 4/2010 | Shtrom et al. |
| 2010/0299518 A1* | 11/2010 | Viswanathan et al. ........ 713/152 |
| 2010/0332828 A1* | 12/2010 | Goto ........................ 713/168 |
| 2011/0007705 A1* | 1/2011 | Buddhikot et al. ........... 370/331 |
| 2011/0035624 A1 | 2/2011 | Miller |
| 2011/0040870 A1* | 2/2011 | Wynn et al. |
| 2011/0047603 A1* | 2/2011 | Gordon et al. ................ 726/5 |
| 2011/0055898 A1 | 3/2011 | Jou |
| 2011/0095960 A1 | 4/2011 | Shtrom |
| 2011/0126016 A1* | 5/2011 | Sun .......................... 713/171 |
| 2011/0208866 A1* | 8/2011 | Marmolejo-Meillon et al. |
| 2011/0271111 A1 | 11/2011 | Frank et al. |
| 2011/0281609 A1 | 11/2011 | Kuo |
| 2012/0030466 A1 | 2/2012 | Yamaguchi |
| 2012/0054338 A1 | 3/2012 | Ando |
| 2012/0078949 A1* | 3/2012 | Allen et al. |
| 2012/0089845 A1* | 4/2012 | Raleigh ..................... 713/176 |
| 2012/0098730 A1 | 4/2012 | Kish |
| 2012/0134291 A1* | 5/2012 | Raleigh ..................... 370/252 |
| 2012/0257536 A1* | 10/2012 | Kholaif et al. ............. 370/254 |
| 2012/0278654 A1 | 11/2012 | Shen |
| 2012/0284785 A1 | 11/2012 | Salkintzis et al. |
| 2012/0299772 A1 | 11/2012 | Shtrom |
| 2012/0317625 A1 | 12/2012 | Jou |
| 2012/0322035 A1* | 12/2012 | Julia et al. .................. 434/185 |
| 2013/0007853 A1* | 1/2013 | Gupta et al. ................ 726/5 |
| 2013/0038496 A1 | 2/2013 | Shtrom |
| 2013/0047218 A1* | 2/2013 | Smith ........................ 726/4 |
| 2013/0182693 A1* | 7/2013 | Sperling et al. ............. 370/338 |
| 2013/0207865 A1 | 8/2013 | Shtrom |
| 2013/0207866 A1 | 8/2013 | Shtrom |
| 2013/0207877 A1 | 8/2013 | Shtrom |
| 2013/0212656 A1* | 8/2013 | Ranade et al. ............... 726/6 |
| 2013/0241789 A1 | 9/2013 | Shtrom |
| 2014/0007209 A1* | 1/2014 | Zucker |
| 2014/0066112 A1 | 3/2014 | Kuo |
| 2014/0068724 A1 | 3/2014 | Jou |
| 2014/0210681 A1 | 7/2014 | Shtrom |
| 2014/0282951 A1 | 9/2014 | Ranade |

FOREIGN PATENT DOCUMENTS

| | | |
|---|---|---|
| CN | 1708162 | 12/2005 |
| CN | 1316862 | 10/2011 |
| CN | 103441984 | 12/2013 |
| CN | 103858106 | 6/2014 |
| DE | 10 2006 026350 | 12/2006 |
| EP | 0 352 787 | 7/1989 |
| EP | 352 787 | 1/1990 |

(56) References Cited

FOREIGN PATENT DOCUMENTS

| EP | 0 534 612 | 3/1993 |
|---|---|---|
| EP | 0 756 381 | 1/1997 |
| EP | 0 883 206 | 12/1998 |
| EP | 1 152 452 | 11/2001 |
| EP | 1 152 542 | 11/2001 |
| EP | 1 152 543 | 11/2001 |
| EP | 1 376 920 | 6/2002 |
| EP | 1 220 461 | 7/2002 |
| EP | 1 315 311 | 5/2003 |
| EP | 1 450 521 | 8/2004 |
| EP | 1 608 108 | 12/2005 |
| EP | 1 638 261 | 3/2006 |
| EP | 1 724 691 | 11/2006 |
| EP | 1 909 358 | 4/2008 |
| EP | 1 287 588 | 1/2009 |
| EP | 2 705 429 | 3/2014 |
| EP | 1 958 369 | 4/2015 |
| GB | 2 426 870 | 6/2006 |
| GB | 2 423 191 | 8/2006 |
| JP | 3038933 | 7/1989 |
| JP | 03038933 | 2/1991 |
| JP | 2008/088633 | 2/1996 |
| JP | 2008/088633 | 4/1996 |
| JP | 2001-057560 | 2/2001 |
| JP | 2001/057560 | 2/2002 |
| JP | 2002-505835 | 2/2002 |
| JP | 2005-354249 | 12/2005 |
| JP | 2005/354249 | 12/2005 |
| JP | 2006/060408 | 3/2006 |
| JP | 2014-522142 | 8/2014 |
| TW | 201351188 | 12/2013 |
| WO | WO 90/04893 | 5/1990 |
| WO | WO 99/55012 | 10/1999 |
| WO | WO 01/13461 | 2/2001 |
| WO | WO 01/69724 | 9/2001 |
| WO | WO 01/84323 | 11/2001 |
| WO | WO 02/07258 A2 | 1/2002 |
| WO | WO 02/07258 A3 | 1/2002 |
| WO | WO 02/25967 | 3/2002 |
| WO | WO 03/079484 | 9/2003 |
| WO | WO 03/081718 | 10/2003 |
| WO | WO 2004/051798 | 6/2004 |
| WO | WO 2006/023247 | 3/2006 |
| WO | WO 2006/057679 | 6/2006 |
| WO | WO 2007/064822 | 6/2007 |
| WO | WO 2007/076105 | 7/2007 |
| WO | WO 2007/127087 | 11/2007 |
| WO | WO 2007/127120 | 11/2007 |
| WO | WO 2007/127162 | 11/2007 |
| WO | WO 2012/151224 | 11/2012 |
| WO | WO 2013/119750 | 8/2013 |
| WO | WO 2013/152027 | 10/2013 |

OTHER PUBLICATIONS

Abramov 2003—P.R. 3-3 © Chart for U.S. Patent No. 7,525,486 and U.S. Patent No. 7,193,562.
Abramov 273—P.R. 3-3 © Chart for U.S. Patent No. 7,525,486 and U.S. Patent No. 7,193,562.
Abramov 296—P.R. 3-3 © Chart for U.S. Patent No. 7,525,486 and U.S. Patent No. 7,193,562.
Airgain 2004—P.R. 3-3 © Chart for U.S. Patent No. 7,525,486 and U.S. Patent No. 7,193,562.
Bancroft 863—P.R. 3-3 © Chart for U.S. Patent No. 7,525,486 and U.S. Patent No. 7,193,562.
Barabash 059—P.R. 3-3 © Chart for U.S. Patent No. 7,525,486 and U.S. Patent No. 7,193,562.
Cetiner 2003—P.R. 3-3 © Chart for U.S. Patent No. 7,525,486 and U.S. Patent No. 7,193,562.
Chuang 2003—P.R. 3-3 © Chart for U.S. Patent No. 7,525,486 and U.S. Patent No. 7,193,562.
Evans 864—P.R. 3-3 © Chart for U.S. Patent No. 7,525,486.
Johnson 404—P.R. 3-3 © Chart for U.S. Patent No. 7,525,486 and U.S. Patent No. 7,193,562.
Kalis 2000—P.R. 3-3 © Chart for U.S. Patent No. 7,525,486 and U.S. Patent No. 7,193,562.
Kalis 2002—P.R. 3-3 © Chart for U.S. Patent No. 7,525,486.
Kaluzni 717—P.R. 3-3 © Chart for U.S. Patent No. 7,525,486 and U.S. Patent No. 7,193,562.
Kim 693—P.R. 3-3 © Chart for U.S. Patent No. 7,525,486 and U.S. Patent No. 7,193,562.
Lin 836—P.R. 3-3 © Chart for U.S. Patent No. 7,525,486 and U.S. Patent No. 7,193,562.
Nakao 762—P.R. 3-3 © Chart for U.S. Patent No. 7,525,486.
Okada 201—P.R. 3-3 © Chart for U.S. Patent No. 7,525,486 and U.S. Patent No. 7,193,562.
Palmer 773—P.R. 3-3 © Chart for U.S. Patent No. 7,525,486 and U.S. Patent No. 7,193,562.
Paun 749—P.R. 3-3 © Chart for U.S. Patent No. 7,525,486 and U.S. Patent No. 7,193,562.
Qian 2000—P.R. 3-3 © Chart for U.S. Patent No. 7,525,486 and U.S. Patent No. 7,193,562.
Shehab 2003—P.R. 3-3 © Chart for U.S. Patent No. 7,525,486 and U.S. Patent No. 7,193,562.
Shirosaka 907—P.R. 3-3 © Chart for U.S. Patent No. 7,525,486 and U.S. Patent No. 7,193,562.
Shtrom 198 & 280—P.R. 3-3 © Chart for U.S. Patent No. 7,525,486 and U.S. Patent No. 7,193,562.
Sievenpiper 254—P.R. 3-3 © Chart for U.S. Patent No. 7,525,486 and U.S. Patent No. 7,193,562.
Simons 1994—P.R. 3-3 © Chart for U.S. Patent No. 7,525,486 and U.S. Patent No. 7,193,562.
Sward 643—P.R. 3-3 © Chart for U.S. Patent No. 7,525,486 and U.S. Patent No. 7,193,562.
Vaughan 1995—P.R. 3-3 © Chart for U.S. Patent No. 7,525,486 and U.S. Patent No. 7,193,562.
Wang 703—P.R. 3-3 © Chart for U.S. Patent No. 7,525,486 and U.S. Patent No. 7,193,562.
Alard, M., et al., "Principles of Modulation and Channel Coding for Digital Broadcasting for Mobile Receivers," 8301 EBU Review Technical, Aug. 1987, No. 224, Brussels, Belgium.
Ando et al., "Study of Dual-Polarized Omni-Directional Antennas for 5.2 GHz-Band 2×2 MIMO-OFDM Systems," Antennas and Propogation Society International Symposium, 2004, IEEE, pp. 1740-1743 vol. 2.
"Authorization of Spread Spectrum Systems Under Parts 15 and 90 of the FCC Rules and Regulations," Rules and Regulations Federal Communications Commission, 47 CFR Part 2, and 90, Jun. 18, 1985.
"Authorization of spread spectrum and other wideband emissions not presently provided for in the FCC Rules and Regulations," Before the Federal Communications Commission, FCC 81-289, 87 F.C.C.2d 876, Gen Docket No. 81-413, Jun. 30, 1981.
Bedell, Paul, "Wireless Crash Course," 2005, p. 84, The McGraw-Hill Companies, Inc., USA.
Behdad et al., Slot Antenna Miniaturization Using Distributed Inductive Loading, Antenna and Propagation Society International Symposium, 2003 IEEE, vol. 1, pp. 308-311 (Jun. 2003).
Berenguer, Inaki, et al., "Adaptive MIMO Antenna Selection," Nov. 2003.
Casas, Eduardo F., et al., "OFDM for Data Communication Over Mobile Radio FM Channels—Part I: Analysis and Experimental Results," IEEE Transactions on Communications, vol. 39, No. 5, May 1991, pp. 783-793.
Casas, Eduardo F., et al., "OFDM for Data Communication over Mobile Radio FM Channels; Part II: Performance Improvement," Department of Electrical Engineering, University of British Columbia.
Chang, Robert W., et al., "A Theoretical Study of Performance of an Orthogonal Multiplexing Data Transmission Scheme," IEEE Transactions on Communication Technology, vol. Com-16, No. 4, Aug. 1968, pp. 529-540.
Chang, Robert W., "Synthesis of Band-Limited Orthogonal Signals for Multichannel Data Transmission," The Bell System Technical Journal, Dec. 1966, pp. 1775-1796.C.
Chuang et al., A 2.4 GHz Polarization-diversity Planar Printed Dipole Antenna for WLAN and Wireless Communication Applications, Microwave Journal, vol. 45, No. 6, pp. 50-62 (Jun. 2002).

(56) References Cited

OTHER PUBLICATIONS

Cimini, Jr., Leonard J, "Analysis and Simulation of a Digital Mobile Channel Using Orthogonal Frequency Division Multiplexing," IEEE Transactions on Communications, vol. Com-33, No. 7, Jul. 1985, pp. 665-675.
English Translation of PCT Pub. No. WO2004/051798 (as filed U.S. Appl. No. 10/536,547).
Frederick et al., Smart Antennas Based on Spatial Multiplexing of Local Elements (SMILE) for Mutual Coupling Reduction, IEEE Transactions of Antennas and Propogation, vol. 52., No. 1, pp. 106-114 (Jan. 2004).
Gaur, Sudhanshu, et al., "Transmit/Receive Antenna Selection for MIMO Systems to Improve Error Performance of Linear Receivers," School of ECE, Georgia Institute of Technology, Apr. 4, 2005.
Gledhill, J. J., et al., "The Transmission of Digital Television in the UHF Band Using Orthogonal Frequency Division Multiplexing," Sixth International Conference on Digital Processing of Signals in Communications, Sep. 2-6, 1991, pp. 175-180.
Information Society Technologies Ultrawaves, "System Concept / Architecture Design and Communication Stack Requirement Document," Feb. 23, 2004.
Molisch, Andreas F., et al., "MIMO Systems with Antenna Selection—an Overview," Draft, Dec. 31, 2003.
Moose, Paul H., "Differential Modulation and Demodulation of Multi-Frequency Digital Communications Signals," 1990 IEEE,CH2831-6/90/0000-0273.
ORINOCO AP-2000 5GHz Kit, "Access Point Family," Proxim Wireless Corporation.
Pat Calhoun et al., "802.11r strengthens wireless voice," Technology Update, Network World, Aug. 22, 2005, http://www.networkworld.com/news/tech/2005/082208techupdate.html.
Press Release, NETGEAR RangeMax(TM) Wireless Networking Solutions Incorporate Smart MIMO Technology to Eliminate Wireless Dead Spots and Take Consumers Farther, Ruckus Wireles Inc. (Mar. 7, 2005), available at http://ruckuswireless.com/press/releases/20050307.php.
RL Miller, "4.3 Project X—A True Secrecy System for Speech," Engineering and Science in the Bell System, A History of Engineering and Science in the Bell System National Service in War and Peace (1925-1975), pp. 296-317, 1978, Bell Telephone Laboratories, Inc.
Sadek, Mirette, et al., "Active Antenna Selection in Multiuser MIMO Communications," IEEE Transactions on Signal Processing, vol. 55, No. 4, Apr. 2007, pp. 1498-1510.
Saltzberg, Burton R., "Performance of an Efficient Parallel Data Transmission System," IEEE Transactions on Communication Technology, vol. Com-15, No. 6, Dec. 1967, pp. 805-811.
Tsunekawa, Kouichi, "Diversity Antennas for Portable Telephones," 39th IEEE Vehicular Technology Conference, pp. 50-56, vol. I, Gateway to New Concepts in Vehicular Technology, May 1-3, 1989, San Francisco, CA.
Varnes et al., A Switched Radial Divider for an L-Band Mobile Satellite Antenna, European Microwave Conference (Oct. 1995), pp. 1037-1041.
W.E. Doherty, Jr. et al., The Pin Diode Circuit Designer's Handbook (1998).
Weinstein, S. B., et al., "Data Transmission by Frequency-Division Multiplexing Using the Discrete Fourier Transform," IEEE Transactions on Communication Technology, vol. Com-19, No. 5, Oct. 1971, pp. 628-634.
Petition Decision Denying Request to Order Additional Claims for U.S. Patent No. 7,193,562 (Control No. 95/001078) mailed on Jul. 10, 2009.
Right of Appeal Notice for U.S. Patent No. 7,193,562 (Control No. 95/001078) mailed on Jul. 2009.
European Examination Report for EP Application No. 05776697.4 mailed Jan. 21, 2011.
European Second Examination Report for EP Application No. 07775498.4 dated Mar. 12, 2013.
European Third Examination Report for EP Application No. 07775498.4 dated Oct. 17, 2011.
European First Examination Report for EP Application No. 09014989.9 dated May 7, 2012.
Supplementary European Search Report for EP Application No. EP05776697.4 dated Jul. 10, 2009.
Supplementary European Search Report for EP Application No. EP07755519 dated Mar. 11, 2009.
PCT Application No. PCT/US2005/27023, International Search Report and Written Opinion mailed Dec. 23, 2005.
PCT Application No. PCT/US2006/49211, International Search Report and Written Opinion mailed Aug. 29, 2008.
PCT Application No. PCT/US2007/09276, International Search Report and Written Opinion mailed Aug. 11, 2008.
Chinese Application No. 200680048001.7, Office Action dated Jun. 20, 2012.
Chinese Application No. 200780020943.9, Office Action dated Feb. 7, 2013.
Chinese Application No. 200780020943.9, Office Action dated Aug. 29, 2012.
Chinese Application No. 200780020943.9, Office Action dated Dec. 19, 2011.
Chinese Application No. 200910258884.X, Office Action dated Aug. 3, 2012.
Taiwan Application No. 094127953, Office Action dated Mar. 20, 2012.
Taiwan Application No. 096114265, Office Action dated Jun. 20, 2011.
U.S. Appl. No. 11/010,076, Office Action mailed Oct. 31, 2006.
U.S. Appl. No. 11/010,076, Final Office Action mailed Aug. 8, 2006.
U.S. Appl. No. 11/010,076, Office Action mailed Dec. 23, 2006.
U.S. Appl. No. 11/022,080, Office Action mailed Jul. 21, 2006.
U.S. Appl. No. 11/041,145, Final Office Action mailed Jan. 29, 2007.
U.S. Appl. No. 11/041,145, Office Action mailed Jul. 21, 2006.
U.S. Appl. No. 11/265,751, Office Action mailed Mar. 18, 2008.
U.S. Appl. No. 11/714,707, Final Office Action mailed May 30, 2008.
U.S. Appl. No. 11/714,707, Office Action mailed Oct. 15, 2007.
U.S. Appl. No. 11/924,082, Office Action mailed Aug. 29, 2008.
U.S. Appl. No. 12/082,090, Office Action mailed Jan. 18, 2011.
U.S. Appl. No. 12/404,124, Final Office Action mailed Feb. 7, 2012.
U.S. Appl. No. 12/404,124, Office Action mailed Sep. 19, 2011.
U.S. Appl. No. 12/953,324, Office Action mailed Mar. 24, 2011.
U.S. Appl. No. 13/280,278, Office Action mailed Mar. 25, 2013.
U.S. Appl. No. 13/280,278, Final Office Action mailed Aug. 22, 2012.
U.S. Appl. No. 13/280,278, Office Action mailed Feb. 21, 2012.
U.S. Appl. No. 13/305,609, Final Office Action mailed Jul. 3, 2012.
U.S. Appl. No. 13/305,609, Office Action mailed Dec. 20, 2011.
U.S. Appl. No. 13/370,201, Office Action mailed May 13, 2013.
U.S. Appl. No. 13/485,012, Final Office Action mailed Mar. 3, 2013.
U.S. Appl. No. 13/485,012, Office Action mailed Oct. 25, 2012.
Encrypted Preshared key; cisco corp. 14 pages, 2010.
Request for Inter Partes Reexamination for U.S. Patent No. 7,358,912, filed by Rayspan Corporation and Netgear, Inc. on Sep. 4, 2008.
Third Party Comments after Patent Owner's Response in Accordance with 37 CFR 1.947 for U.S. Patent No. 7,358,912 (Control No. 95/001079) mailed on Jul. 17, 2009.
U.S. Appl. No. 95/001,078, Sep. 4, 2008, Shtrom et al. (Re-Exam).
U.S. Appl. No. 95/001,079, Sep. 4, 2008, Shtrom et al. (Re-Exam).
PCT Application No. PCT/US2005/027169, International Search Report and Written Opinion mailed Aug. 10, 2006.
PCT Application No. PCT/US2013/34997, International Search Report mailed Jun. 17, 2013.
Chinese Application No. 20058001532.6, Office Action dated Jun. 23, 2011.
Chinese Application No. 200910258884.X, Office Action dated Apr. 15, 2013.
Taiwan Application No. 094127953, Office Action dated Aug. 16, 2011.
U.S. Appl. No. 12/404,127, Final Office Action mailed Feb. 7, 2012.
U.S. Appl. No. 12/404,127, Office Action mailed Sep. 19, 2011.
U.S. Appl. No. 11/877,465, Final Office Action mailed May 16, 2013.
U.S. Appl. No. 11/877,465, Office Action mailed Oct. 3, 2012.
U.S. Appl. No. 11/877,465, Final Office Action mailed Jun. 20, 2012.
U.S. Appl. No. 11/877,465, Office Action mailed Sep. 19, 2011.

(56) References Cited

OTHER PUBLICATIONS

U.S. Appl. No. 11/877,465, Final Office Action mailed Dec. 9, 2010.
U.S. Appl. No. 11/877,465, Office Action mailed Apr. 12, 2010.
U.S. Appl. No. 12/980,253, Final Office Action mailed Jun. 6, 2013.
U.S. Appl. No. 12/980,253, Office Action mailed Aug. 17, 2012.
U.S. Appl. No. 12/980,253, Office Action mailed Sep. 13, 2011.
U.S. Appl. No. 12/980,253, Office Action mailed Mar. 1, 2011.
U.S. Appl. No. 12/425,374, Office Action mailed Jul. 6, 2010.
U.S. Appl. No. 11/413,461, Office Action mailed Jun. 7, 2007.
U.S. Appl. No. 13/653,405, Office Action mailed Dec. 19, 2012.
U.S. Appl. No. 13/731,273, Office Action mailed May 23, 2013.
U.S. Appl. No. 13/396,482, Office Action mailed Oct. 18, 2013.
U.S. Appl. No. 13/396,484, Office Action mailed Oct. 11, 2013.
Bargh et al., "Fast Authentication Methods for Handovers between IEEE 802.11 Wireless LANs", Proceedings of the ACM International Workshop on Wireless Mobile Applications and Services on WLAN Hotspots. Oct. 1, 2004.
Kassab et al., "Fast Pre-Authentication Based on Proactive Key Distribution for 802.11 Infrastructure Networks", WMuNeP'05, Oct. 13, 2005, Montreal, Quebec, Canada, Copyright 2005 ACM.
European Second Examination Report for EP Application No. 09014989.9 dated Dec. 13, 2013.
Taiwan Application No. 094141018, Office Action dated May 8, 2013.
U.S. Appl. No. 13/653,405, Office Action mailed Dec. 19, 2013.
U.S. Appl. No. 12/980,253, Office Action mailed Mar. 27, 2014.
U.S. Appl. No. 13/396,482, Final Office Action mailed Mar. 28, 2014.
U.S. Appl. No. 13/396,484, Final Office Action mailed Apr. 11, 2014.
U.S. Appl. No. 11/877,465, Office Action mailed Jul. 29, 2014.
U.S. Appl. No. 13/396,482, Office Action mailed Sep. 16, 2014.
U.S. Appl. No. 12/980,253, Final Office Action mailed Jan. 23, 2015.
U.S. Appl. No. 13/396,482, Final Office Action mailed Jan. 22, 2015.
U.S. Appl. No. 13/396,484, Office Action mailed Jan. 21 2015.
Aboba, Bernard "Virtual Access Points," IEEEP802.11 Wireless LANs, XX, XX, No. 802.11-03/154r1, May 22, 2003.
Areg Alimian et al., "Analysis of Roaming Techniques," doc.:IEEE 802.11-04/0377r1, Submission, Mar. 2004.
Chang, Nicholas B. et al., "Optimal Channel Probing and Transmission Scheduling for Opportunistics Spectrum Access," Sep. 2007.
Cisco Systems, "Cisco Aironet Access Point Software Configuration Guide: Configuring Filters and Quality of Service," Aug. 2003.
Dell Inc., "How Much Broadcast and Multicast Traffic Should I Allow in My Network," PowerConnect Application Note #5, Nov. 2003.
Dunkels, Adam et al., "Connecting Wireless Sensornets with TCP/IP Networks," Proc. of the 2d Int'l Conf. on Wired Networks, Frankfurt, Feb. 2004.
Dunkels, Adam et al., "Making TCP/IP Viable for Wireless Sensor Networks," Proc. of the 1st Euro. Workshop on Wireless Sensor Networks, Berlin, Jan. 2004.
Dutta, Ashutosh et al., "MarconiNet Supporting Streaming Media Over Localized Wireless Multicast," Proc. of the 2d Int'l Workshop on Mobile Commerce, 2002.
Festag, Andreas, "What is MOMBASA?" Telecommunication Networks Group (TKN), Technical University of Berlin, Mar. 7, 2002.
Golmie, Nada, "Coexistence in Wireless Networks: Challenges and System-Level Solutions in the Unlicensed Bands," Cambridge University Press, 2006.
Hewlett Packard, "HP ProCurve Networking: Enterprise Wireless LAN Networking and Mobility Solutions," 2003.
Hirayama, Koji et al., "Next-Generation Mobile-Access IP Network," Hitachi Review vol. 49, No. 4, 2000.
Ian F. Akyildiz, et al., "A Virtual Topology Based Routing Protocol for Multihop Dynamic Wireless Networks," Broadband and Wireless Networking Lab, School of Electrical and Computer Engineering, Georgia Institute of Technology.
IEEE Trial-Use Recommended Practice for Multi-Vendor Access Point Interoperability Via an Inter-Access Point Protocol Across Distribution Systems Supporting IEEE 802.11 Operation; IEEE Std 802.11 F-2003 ED, IEEE Standard, IEEE, Piscataway, NJ, USA, Jan. 1, 2003, pp. 1-67.
Information Society Technologies Ultrawaves, "System Concept/ Architecture Design and Communication Stack Requirement Document," Feb. 23, 2004.
Keidl et al., TES2003, LNCS v. 2819, pp. 104-118, Sep. 2003.
Ken Tang, et al., "MAC Layer Broadcast Support in 802.11 Wireless Networks," Computer Science Department, University of California, Los Angeles, 2000 IEEE, pp. 544-548.
Ken Tang, et al., "MAC Reliable Broadcast in Ad Hoc Networks," Computer Science Department, University of California, Los Angeles, 2001 IEEE, pp. 1008-1013.
Mawa, Rakesh, "Power Control in 3G Systems," Hughes Systique Corporation, Jun. 28, 2006.
Microsoft Corporation, "IEEE 802.11 Networks and Windows XP," Windows Hardware Developer Central, Dec. 4, 2001.
Pat Calhoun et al., "802.11 r strengthens wireless voice," Technology Update, Network World, Aug. 22, 2005, http://www.networkworld.com/news/tech/2005/082208techupdate.html.
Steger, Christopher et al., "Performance of IEEE 802.11b Wireless LAN in an Emulated Mobile Channel," 2003.
Toskala, Antti, "Enhancement of Broadcast and Introduction of Multicast Capabilities in RAN," Nokia Networks, Palm Springs, California, Mar. 13-16, 2001.
Tsunekawa, Kouichi, "Diversity Antennas for Portable Telephones", 39th IEEE Vehicular Technology Conference, pp. 50-56, vol. 1, Gateway to New Concepts in Vehicular Technology, May 1-3, 1989, San Francisco, CA.
Vincent D. Park, et al., "A Performance Comparison of the Temporally-Ordered Routing Algorithm and Ideal Link-State Routing," IEEE, Jul. 1998, pp. 592-598.
Wennstrom, Mattias et al., "Transmit Antenna Diversity in Ricean Fading MIMO Channels with Co-Channel Interference," 2001.
Yang, Song Li, Virtual AP for 802.11 Seamless Handoff draft-song-80211-seamless-handoff-00.txt.
Extended European Search Report for EP application No. 07755678.5 mailed Dec. 29, 2011.
Extended European Search Report for EP application No. 06838713.3 mailed Jul. 13, 2011.
Extended European Search Report for EP application No. 14163071.5 mailed Jul. 4, 2014.
Supplementary European Search Report for EP application No. 07755678.5 mailed Jan. 17, 2012.
PCT Application No. PCT/US2006/045893, International Search Report and Written Opinion Sep. 25, 2007.
PCT Application No. PCT/US2007/09836, International Search Report and Written Opinion Sep. 12, 2008.
PCT Application No. PCT/US2007/09503, International Search Report and Written Opinion Mar. 3, 2008.
PCT Application No. PCT/US2012/036028, International Search Report and Written Opinion Aug. 7, 2012.
Chinese Office Action for CN Application No. 200680045272.7 mailed Oct. 27, 2011.
Chinese Office Action for CN Application No. 200680045272.7 mailed Jul. 12, 2011.
Chinese Office Action for CN Application No. 200680045272.7 mailed Feb. 1, 2011.
Chinese Office Action for CN Application No. 200680045272.7 mailed Jul. 15, 2010.
Chinese Office Action for CN Application No. 200780019074.8 mailed Jun. 15, 2011.
Chinese Office Action for CN Application No. 200780019389.2 mailed Sep. 12, 2012.
Chinese Office Action for CN Application No. 200780019389.2 mailed Feb. 14, 2012.
Chinese Office Action for CN Application No. 200780019389.2 mailed Apr. 8, 2011.
European First Examination Report for EP Application No. 068387133 mailed Apr. 3, 2012.
European Second Examination Report for EP Application No. 07755678.5 dated Feb. 3, 2014.

(56) References Cited

OTHER PUBLICATIONS

European First Examination Report for EP Application No. 07755678.5 dated Oct. 23, 2012.
European First Examination Report for EP Application No. 07755913.6 dated Jul. 4, 2013.
U.S. Appl. No. 11/607,619, Office Action mailed Oct. 13, 2010.
U.S. Appl. No. 11/607,619, Final Office Action mailed Dec. 4, 2009.
U.S. Appl. No. 11/607,619, Office Action mailed Apr. 29, 2009.
U.S. Appl. No. 13/191,383, Office Action mailed Jul. 22, 2013.
U.S. Appl. No. 11/788,371, Final Office Action mailed Jan. 21, 2010.
U.S. Appl. No. 11/788,371, Office Action mailed Sep. 17, 2009.
U.S. Appl. No. 11/789,446, Final Office Action mailed Oct. 13, 2010.
U.S. Appl. No. 11/789,446, Office Action mailed May 24, 2010.
U.S. Appl. No. 11/789,446, Final Office Action mailed Jun. 24, 2009.
U.S. Appl. No. 11/789,446, Office Action mailed Sep. 3, 2008.
U.S. Appl. No. 12/339,688, Office Action mailed Sep. 15, 2009.
U.S. Appl. No. 12/845,089, Final Office Action mailed Feb. 14, 2012.
U.S. Appl. No. 12/845,089, Office Action mailed Sep. 6, 2011.
U.S. Appl. No. 13/590,997, Office Action mailed Jul. 18, 2013.
U.S. Appl. No. 14/078,947, Final Office Action mailed Feb. 23, 2015.
U.S. Appl. No. 14/078,947, Office Action mailed Sep. 24, 2014.
U.S. Appl. No. 14/294,012, Office Action mailed Mar. 23, 2015.
U.S. Appl. No. 13/461,679, Office Action mailed Mar. 28, 2014.
U.S. Appl. No. 13/461,679, Final Office Action mailed Oct. 25, 2013.
U.S. Appl. No. 13/461,679, Office Action mailed Apr. 1, 2013.
Extended European Search Report for EP application No. 12779857.7 dated Mar. 30, 2015.

* cited by examiner

KEY ASSIGNMENT FOR A BRAND

BACKGROUND

1. Field of the Invention

The present invention generally relates to key assignment. More specifically, the present invention relates to key assignment for a brand.

2. Description of the Related Art

An increasing number of individuals and businesses rely on wireless services to carry out various transactions and enable communication from remote locations. Many businesses such as hotels and coffee houses have sought to capitalize on this trend and offer free wireless access to attract and retain customers. A business offering such wireless access may do by creating a "hotspot"—a location that offers Internet access over a wireless local area network through the use of a router connected to a link to an Internet service provider.

Many hotspots only offer open and unsecured communications. Some users, however, may wish to engage in communications or transactions that involve personal, sensitive, or proprietary information that is not necessarily suited for an open and unsecured communications network. As such, users may wish for such transactions be conducted in a secure manner, such that such information may not be exposed or stolen.

Implementing security features is complicated, difficult to maintain, and requires a high level of technical knowledge. An additional complication is that users at a hotspot may be continually changing. Authentication relying on 802.1x/EAP is not a practical option as hotspot users may vary widely in security needs. Setting up a RADIUS server on a network backend may likewise be complicated and unwieldy.

Pre-shared key (PSK)-based security systems require that a secret be manually entered onto all user devices using the network. A PSK-based system relies on a secret shared between and stored at both the client station and the access point. The secret may be, for example, a long bit stream, such as a passphrase, a password, a hexadecimal string, or the like. Used by a client station and the access point to authenticate each other, the secret may also be used to generate an encryption key set.

A disadvantage to PSK-based systems is that once the shared secret becomes known to unauthorized personnel, the security of the entire network is compromised. This may pose a problem where network access is provided to an ever-changing set of numerous, diverse, and transient mobile users. Generally, to maintain the security of a PSK-based system, the secret must be changed on all client stations whenever a person with knowledge of the secret departs from the organization or is no longer authorized to access the network. As a result, many commercial organizations (e.g., small- and medium-sized businesses or enterprises with a high degree of turn over) have been unable to deploy security measures around their hotspots, because of their lack of expertise and/or full-time professional technical support.

In addition, a business (e.g., branded hotels) may have multiple locations where customers are provided service. While wireless internet services may be provided at these multiple locations, the customer is generally required to login and authenticate anew at each location. Such a business may wish to be able to leverage the information previously provided and steps previously performed at one location to facilitate and ease the customer experience at a second location. As used herein, a brand refers to any related products or services that may be provided at a plurality of locations. A branded hotspot, for example, may be a hotspot associated with a particular coffee shop that is associated with a chain of coffee shops, each of which may have its own branded hotspot.

SUMMARY OF THE CLAIMED INVENTION

Embodiments of the present invention include systems and methods for providing secured network access at a branded hotspot. A user device located within range of a branded hotspot initiates a request for the secured network access. The request concerns secured network access at the hotspot by the user device and includes a unique pre-shared key. A query regarding the unique pre-shared key is sent to a database, which retrieves information regarding a corresponding pre-shared key. That information is sent to the hotspot controller, which allows the user device secured network access as governed by one or more parameters associated with the pre-shared key.

Various embodiments of the present invention include methods for providing secured network access at a branded hotspot. Such methods may include receiving a request for secured network access initiated by a user device located within a range of a hotspot associated with a brand. The request may include a unique pre-shared key associated with the user device. Methods may further include sending a query to a database of pre-shared keys concerning the unique pre-shared key included in the request, receiving a response to the query including a corresponding pre-shared key regarding secured network access that has been generated at another hotspot associated with the brand, and providing secured network access at the hotspot based on the unique pre-shared key associated with the user device and the corresponding pre-shared key.

Additional embodiments include apparatuses for providing secured network access at a branded hotspot. Such apparatuses may include an interface for receiving an incoming request initiated by a user device located within a range of a hotspot associated with a brand and a processor for executing instructions stored in memory to generates a query to a database of pre-shared keys concerning the unique pre-shared key included in the request. The interface may further receive a response to the query including a corresponding pre-shared key regarding secured network access that has been generated at another hotspot associated with the brand, and secured network access may be provided at the hotspot based on the unique pre-shared key associated with the user device and the corresponding pre-shared key.

Embodiments of the present invention may further include systems for providing secured network access at a branded hotspot. Such systems may include a hotspot controller controlling a branded hotspot and comprising an interface that receives an incoming request for secured network access concerning a unique pre-shared key and initiated by a user device located within a range of the branded hotspot, sends a query to a database of pre-shared keys concerning the unique pre-shared key included in the request, and receives a response to the query including a corresponding pre-shared key regarding secured network access that has been generated at another hotspot associated with the brand. Systems may further include an access point associated with the branded hotspot that provides secured network access based on the unique pre-shared key associated with the user device and the corresponding pre-shared key.

Other embodiments of the present invention include non-transitory computer-readable storage media on which is embodied instructions executable to providing secured network access at a branded hotspot in general accordance with the method previously set forth above.

DETAILED DESCRIPTION

Secured network access at a branded hotspot is provided. A user device located within range of the hotspot initiates a request sent via an open communication network associated with the hotspot. The request concerns secured network access at the hotspot by the user device and includes a unique pre-shared key. A query regarding the unique pre-shared key is sent to a database, which retrieves information regarding a corresponding pre-shared key. That information is sent to the hotspot controller, which allows the user device secured network access as governed by one or more parameters associated with the pre-shared key.

Figure 1:
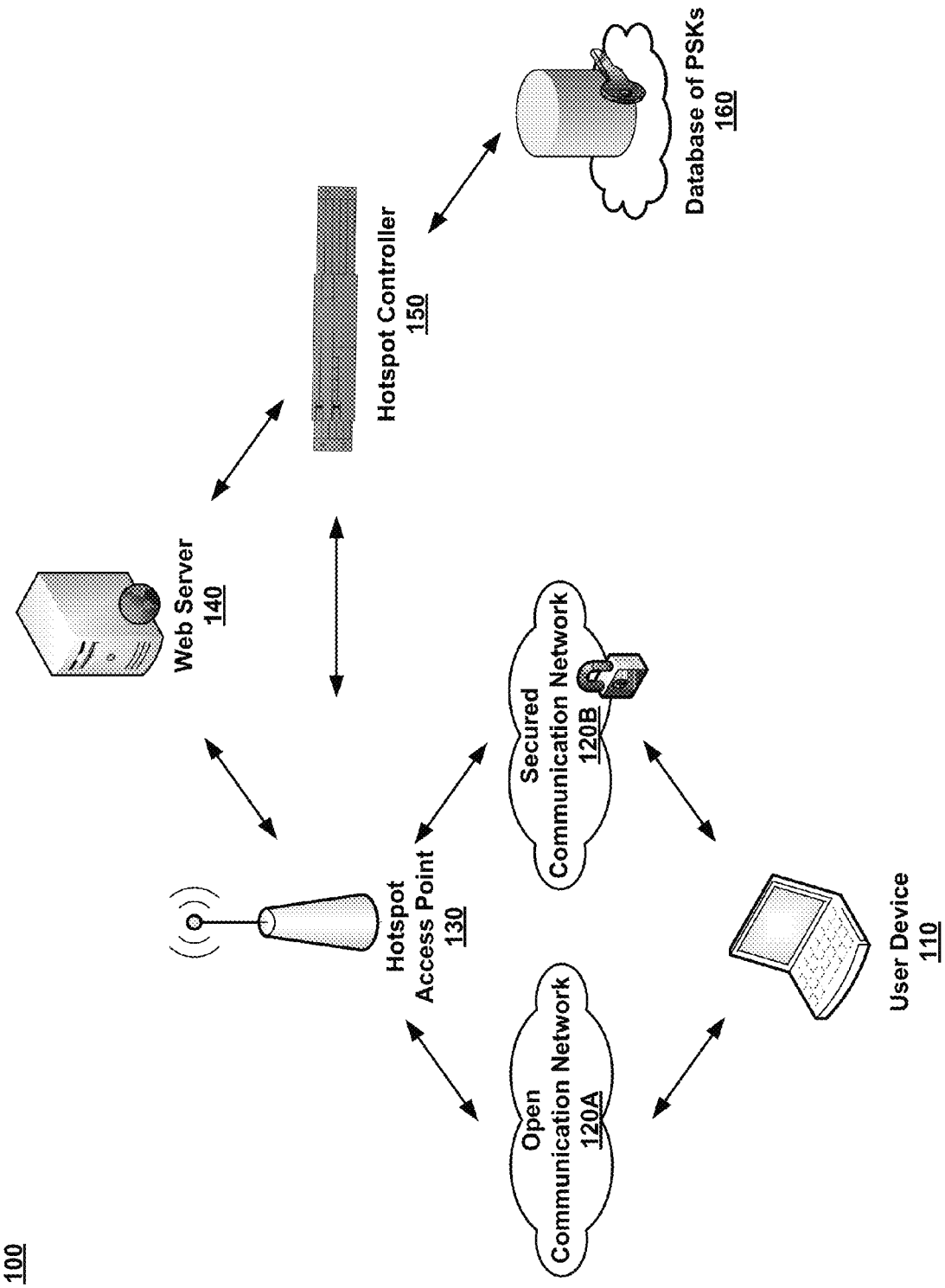
FIG. 1 illustrates a network environment in which a system for providing secured network access at a branded hotspot may be implemented.

FIG. 1 illustrates a network environment 100 in which a system for secured network access at a branded hotspot may be implemented. Network environment 100 may include a user device 110 and a 'hotspot' including access point 130 and that provides open communication network 120A and secured communication network 120B. The network environment 100 may further include web server 140, a hotspot controller 150, and a database of pre-shared keys 160.

Users may use any number of different wireless user devices 110 such as notebook, netbook, and tablet computers with WiFi capability, smartphones with WiFi capability, or any other type of wireless computing device capable of communicating over communication networks 120. User device 110 may also be configured to access data from other storage media, such as memory cards or disk drives as may be appropriate in the case of downloaded services. User device 110 may include standard hardware computing components such as network (e.g., wireless) and media interfaces, non-transitory computer-readable storage (memory), and processors for executing instructions that may be stored in memory.

Communication networks 120A-B may convey various kinds of information to user devices, such as user device 110. Communication networks 120A-B may be a local, proprietary network (e.g., an intranet) and/or may be a part of a larger wide-area network. The communications network 120A-B may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications networks 120A-B allow a connecting device (e.g., user device 110) to access the Internet. Open communication network 120A is open and unsecured. As such, any user device 110 may be able to connect to the open communication network 120A without (much) restriction. In contrast, secured communication network 120B may involve various security policies and protocols so that communications to and from user device 110 may remain secure.

Communication networks 120A-B are provided by a hotspot access point 130, which can transmit various electromagnetic waves. Examples of wireless protocols that might be used by hotspot access point 130 include IEEE 802.11 (Wi-Fi or Wireless LAN), IEEE 802.16 (WiMAX), or IEEE 802.16c network. Hotspot may be inclusive or a number of wireless transceivers distributed over an area.

Access point 130 includes, at the least, an antenna system, radio, memory, and processor. The antenna system wirelessly receives and transmits data packets. For example, the antenna system can receive packet data such as Transmission Control Protocol (TCP) and User Datagram Protocol (UDP) packet data using the IEEE 802.11 wireless protocol. Radio converts data into the requisite wireless protocols. Various instructions governing the control of the access point 130 are stored in memory and executed by processor.

One or more wireless or wired connections may be created to allow for data transmission between access point 130 and user device 110 (via communication networks 120A-B) as well as web server 140, hotspot controller 150, and various other access points in network environment 100. The antenna may further include selectable antenna elements like those disclosed in U.S. Pat. No. 7,292,198 for a "System and Method for an Omnidirectional Planar Antenna Apparatus," the disclosure of which is incorporated herein by reference. Hotspot access point 130 may also utilize various transmission parameter controls like those disclosed in U.S. Pat. No. 7,889,497 for a "System and Method for Transmission Parameter Control for an Antenna Apparatus with Selectable Elements," the disclosure of which is incorporated herein by reference.

Web server 140 may include any type of server or other computing device as is known in the art for communication over the Internet (web). Web server 140 may include standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Hotspot controller 150 manages the one or more hotspot access points 130 in network environment 100. As such, the hotspot controller 150 intelligently manages the hotspot wireless services, including deployment, RF assignments, traffic/load balancing, and security. In terms of security, for example, the hotspot controller 150 may receive a request that a user device 110 be allowed to use the secured communication network 120B. The hotspot controller 150 may be located remotely (e.g., in the cloud) or in the same local area network as the hotspot access point 130.

In some instances, the hotspot controlled by hotspot controller 150 may be associated with a particular brand (e.g., hotel or coffee shop chain). When a user device 110 that is new to a brand requests secure network access, the request may be redirected to web server 140, which may convey the request to hotspot controller 150. Hotspot controller 150 dynamically generates a unique pre-shared key for the requesting user device 110 and return the key to web portal server 140, which in turns generates a web page displaying the unique pre-shared key to the user device 110. User device 110 may then use the pre-shared key in a request to access secure communication network 120B. Information regarding the pre-shared key associated with user device 110 is further sent by hotspot controller 150 to database of pre-shared keys 160 for storage.

The database of pre-shared keys 160 is accessible via the cloud (e.g., Internet) and stores a plurality of pre-shared keys associated with a brand. In some instances, the database 160 may store keys for a plurality of brands. The pre-shared keys and related information (e.g., associated parameter(s) for secured network access) may provided by a plurality of branded hotspots. Because the database 160 is located in the cloud, any hotspot controller 150 may send a query to the database 160 when an unfamiliar (to the hotspot controller 150) user device 110 submits an unfamiliar pre-shared key in a request for secured network access.

In some cases, the user device 110 may wish to request secured network access at another hotspot that is associated with the same brand but that is new to the user device 110. Because the user device 110 is already associated with a pre-shared key, the request sent by user device 110 may be sent using secured communication network 120B to hotspot controller 150. Since the user device 110 is new to this particular hotspot controller 150, a query regarding the pre-shared key is sent to database of pre-shared keys 160. In response to the query, the database 160 retrieves information regarding a corresponding pre-shared key. Such information may additionally include parameters of the secured network access to be provided to the user device 110.

Figure 2:
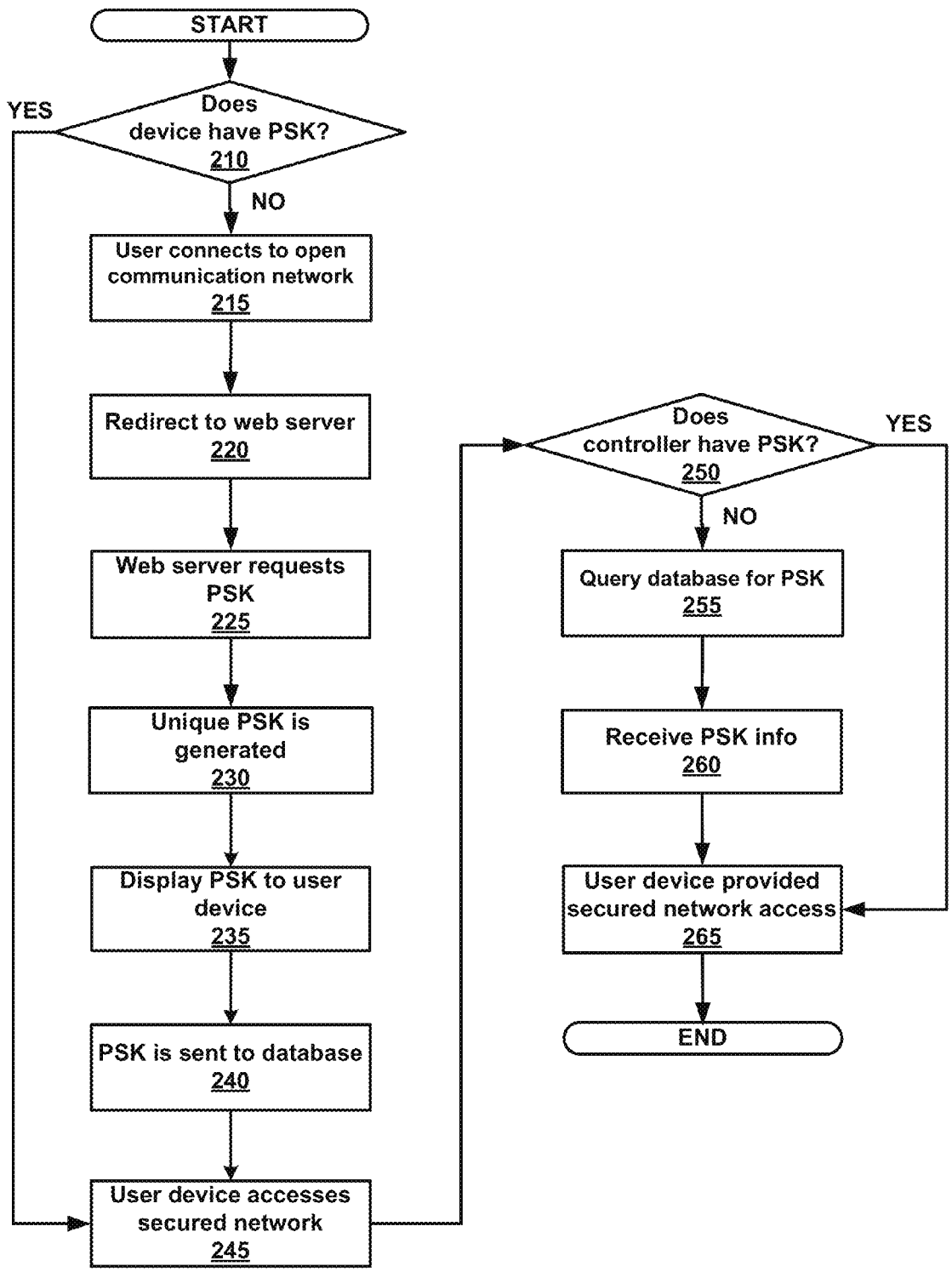
FIG. 2 illustrates a method for providing secured network access at a branded hotspot.

FIG. 2 illustrates a method 200 for providing secure network access at a branded hotspot. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200 of FIG. 2, it is determined whether the user device is already associated with a pre-shared key. If so, the user device connects to an open communication network hosted by a hotspot access point. The request is redirected to a web server, which requests a pre-shared key from a hotspot controller. The hotspot controller may generate and return the unique pre-shared key to the web portal server, which generates a webpage displaying the unique pre-shared key to the user device. The user device may then use the unique pre-shared key to access the secure communication network. Where the user device already has a pre-shared key, the user device may immediately connect to the secured communication network.

It is further determined whether the controller has a corresponding pre-shared key. Where the particular controller generated the key, for example, the controller may already have a corresponding key stored in memory. In some cases, however, the user device may be requesting secured network access from another hotspot new to the user device, but associated with the same brand as the hotspot where the pre-shared key was generated. The particular controller at the new hotspot may request the database for information regarding the pre-shared key associated with the user device. Such information may be retrieved and sent to the new hotspot, and secured network access is provided to the user device in accordance with the retrieved information.

In step 210, it is determined whether the user device 110 has already been associated with a pre-shared key. In such a scenario, user device 110 is within a range of a branded hotspot and is attempting to connect to a secured wireless network. If the user device 110 is already associated with a pre-shared key (e.g., previously generated at the branded hotspot or at another hotspot associated with the same brand), the method may skip ahead to step 245. If the user device 110 is not already associated with a pre-shared key, the method proceeds to step 215.

In step 215, a user device 110 connects to an open communication network 120A provided by hotspot access point 130. For some network activity (e.g., reading the news), the user may not necessarily require security and the use of the open communication network 120A may be sufficient. Some transactions (e.g., financial or business related) may require additional security so as to ensure that sensitive information is not exposed or misappropriated by other users of the open communication network 120A. The user of device 110 may be offered access to the secured communication network 120B as an option. Upon selection of that offering, a user request for access to the secure communication network 120B may be sent over the open communication network 120A. Connection to the open communication network 120A may, in some implementations, automatically initiate a request for secure access to the secured communication network 120B.

In step 220, the request for secure network access is redirected to web portal server 140. In addition to information regarding the particular user device 110, the access request may include information concerning various policies and parameters as determined by the particular entity (e.g., business) providing wireless access at the hotspot. These parameters and policies may include information used to configure a wireless device for connection to a restricted wireless network and access policies related to the same, such as a wireless network name, wireless device parameters, adapter configurations, security-related parameters, access constraints, quality of service parameters, security-related parameters, expiration date of the secure access, limits on session duration, bandwidth, user identity, user rewards, and access policies.

In step 225, the web portal server 140 submits a request for a unique pre-shared key to hotspot controller 150. Assigning each individual user/user device 110 a unique pre-shared key ensures that third-parties cannot eavesdrop on or otherwise access information belonging to another user accessing the network by way of device 110. Because each pre-shared key is unique, the encryption (and decryption) of information belonging to one particular user is different from that for any other user. Moreover, when the user leaves the hotspot, the unique pre-shared key assigned to that user/user device 110 does not need to be changed to maintain security for users remaining in the hotspot.

In step 230, the hotspot controller 150 generates a unique pre-shared key for the requesting user device 110 and sends the generated unique pre-shared key to the web portal server 140. Hotspot controller 150 may randomly generate the unique pre-shared secret for each user device 110 using various algorithms and formulas. By providing for randomly generated and unique keys, hotspot controller 150 increases the difficulty of illicitly gaining accessing user information by deducing the secret of any particular user.

Hotspot controller 150 may also store information associating the particular key with the requesting user device 110. Where a particular business providing the hotspot wishes to apply certain policies and parameters, those policies and parameters may also be stored. A hotel, for example, may wish to provide frequent guests with greater bandwidth than other guests. As such, information regarding the guest identity, the user device 110 belonging to the guests (e.g., as identified by MAC address) and the amount of bandwidth allotted may also be stored in association with the unique pre-shared key.

In step 235, the web portal server 140 generates a webpage to display the unique pre-shared key to the user of user device 110.

In step 240, information regarding the generated pre-shared key is sent from the hotspot controller 150 to the database of pre-shared keys 160. Any related information (e.g., policies and parameters described in relation to step 220) may also be sent to database 160 for storage and retrieval in response to subsequent queries.

In step 245, the unique pre-shared key is entered into user device 110, either manually by the user (e.g., a cut and paste operation), via user selection (e.g., execution of a script associated with a 'install' button), or automatically as a result of instructions embedded with a pre-shared key download package. A subsequent request for access to the secure communication network 120B is generated based on the unique pre-shared key. In some instances, the unique pre-shared key may be bundled as part of a package that may be installed automatically or upon request on the user device 110. The package may include any applications, policies, or parameters required for connection to the secure communication network 120B. For example, an application may be downloaded to the wireless device and executed to survey, configure (e.g., install parameters and policies), and/or connect the wireless device to the secured communication network 120B. The unique pre-shared key may then be used to authenticate the user device 110 so that the user device 110 can access the secured communication network 120B according to the installed policies and parameters.

In step 250, it is determined whether the hotspot controller 150 has a corresponding pre-shared key. In instances where the user device 110 is a repeat user of the same hotspot, the associated hotspot controller 150 may already have a corresponding pre-shared key in memory and the method may skip ahead to step 265. Where secured network access is being requested from a hotspot new to the user device 110, the hotspot controller 150 at this new hotspot may not have a corresponding pre-shared key, and the method proceeds to step 255.

In step 255, a query is generated and sent to a database of pre-shared keys 160. The query may include information regarding the user device 110 that may be used to identify the pre-shared key associated with the user device 110, and other associated information (e.g., policies and parameters described in relation to step 220). In some embodiments, the query may include information to identify the user device 110 (e.g., the MAC address).

In step 260, the pre-shared key information is retrieved from the database 160. Using the information in the query, the database 160 may identify that the user device 110 has been provided with a pre-shared key at a hotspot associated with the same brand as the hotspot (i.e., hotspot controller 150) that sent the query. In addition, certain policies and parameters may have been associated with that pre-shared key at other hotspots at other locations. For example, a customer may accumulate points by staying at a variety of locations of a branded hotel chain. Parameters of secured network access may be adjusted (e.g., higher bandwidth) as a reward to frequent customers. As such, information regarding a corresponding pre-shared key (including related policies and parameters) may be sent to the hotspot controller 150 in response to the query.

In step 265, secured network access is provided to the user device 110 in accordance with the parameters and policies indicated by the query response sent from the database 160. In addition, the current hotspot 160 may update 160 regarding any information that may affect the parameters and policies associated with the secured network access to be provided to the user device 110.

The present invention may be implemented in a variety of devices. Non-transitory computer-readable storage media refer to any non-transitory storage medium or media that participate in providing instructions to a central processing unit (CPU) for execution. Such media can take many forms, including, but not limited to, non-volatile and volatile media, which may include optical disks, dynamic memory, floppy disks, flexible disks, hard disks, magnetic tape, any other magnetic medium, CD-ROM disks, digital video disks (DVDs), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art along with their full scope of equivalents.

What is claimed is:

1. A method for providing secured communication network access, the method comprising:
 receiving a request sent over an open communication network for secured communication network access, the request initiated by a requesting user device located within a range of a first hotspot associated with a brand, the request including a unique pre-shared encryption key associated with the requesting user device, wherein the unique pre-shared encryption key was displayed in a web page generated by a web portal server to the requesting user device;
 determining there is currently no corresponding pre-shared encryption key stored at the first hotspot, wherein the corresponding pre-shared encryption key is required to decrypt communications encrypted based on the unique pre-shared encryption key associated with the requesting user device;
 sending a query for the corresponding pre-shared encryption key to a cloud database of pre-shared encryption keys generated at a plurality of different hotspots, the different hotspots including hotspots associated with a plurality of brands, wherein each pre-shared encryption key in the cloud database corresponds to a different pre-shared encryption key that is unique to an associated user device, the query concerning any prior use of the unique pre-shared encryption key associated with the requesting user device and included in the request;

receiving a response to the query including the corresponding pre-shared encryption key, wherein the corresponding pre-shared encryption key is unique to the requesting user device and had been generated during prior use at a second hotspot associated with the brand; and providing secured communication network access at the first hotspot based on the unique pre-shared encryption key associated with the requesting user device and the corresponding pre-shared encryption key obtained from the cloud database, wherein encryption in accordance with the unique pre-shared encryption key associated with the requesting user device is different than encryption for any other user device in the secured communication network, and wherein the secured communication network access provided to the requesting user device is governed at least in part by at least one parameter identified as being associated with the unique pre-shared encryption key, the at least one parameter including an access policy.

2. The method of claim 1, further comprising storing information regarding the associated at least one parameter, the associated at least one parameter further including one or more of the following: expiration date, session duration, bandwidth, user identity, or user rewards.

3. The method of claim 1, further comprising submitting a second unique pre-shared encryption key to the cloud database of pre-shared encryption keys for retrieval in response to a subsequent query concerning the second pre-shared encryption key.

4. The method of claim 3, wherein adding the second unique pre-shared encryption key to the cloud database of pre-shared encryption keys comprises:

executing instructions stored in memory, wherein execution of the instructions by a processor generates the second unique pre-shared encryption key for a second user device; and transmitting a corresponding pre-shared encryption key associated with the second unique pre-shared encryption key to the cloud database of pre-shared encryption keys for retrieval in response to a subsequent request sent by the second user device while located within range of another hotspot associated with the brand.

5. The method of claim 4, further comprising determining at least one parameter governing the secured communication network access to be provided to the second user device, wherein transmitted information regarding the second unique pre-shared encryption key further includes the at least one parameter.

6. An apparatus for providing secured communication network access, the apparatus comprising:

an interface for receiving an incoming request sent over an open communication network for secured communication network access, the request initiated by a requesting user device located within a range of a first hotspot associated with a brand, the request including a unique pre-shared encryption key associated with the requesting user device, wherein the unique pre-shared encryption key was displayed in a web page generated by a web portal server to the requesting user device; and a processor for executing instructions stored in memory, wherein execution of the instructions by the processor:

determines there is currently no corresponding pre-shared encryption key stored at the first hotspot, wherein the corresponding pre-shared encryption key is required to decrypt communications encrypted based on the unique pre-shared encryption key associated with the requesting user device, and generates a query for the corresponding pre-shared encryption key to a cloud database of pre-shared encryption keys generated at a plurality of different hotspots, the different hotspots including hotspots associated with a plurality of brands, wherein each pre-shared encryption key in the cloud database corresponds to a different pre-shared encryption key that is unique to an associated user device, the query concerning any prior use of the unique pre-shared encryption key associated with the requesting user device and included in the request, wherein the interface receives a response to the query from the cloud database, the response including the corresponding pre-shared encryption wherein the corresponding pre-shared encryption key is unique to the requesting user device and had been generated during prior use at a second hotspot associated with the brand use at a second hotspot associated with the brand;

wherein secured communication network access at the first hotspot is subsequently provided based on the unique pre-shared encryption key associated with the requesting user device and the corresponding pre-shared encryption key obtained from the cloud database, wherein encryption in accordance with the unique pre-shared encryption key associated with the requesting user device is different than encryption for any other user device in the secured communication network, and wherein the secured communication network access provided to the requesting user device is governed at least in part by at least one parameter identified as being associated with the unique pre-shared encryption key, the at least one parameter including an access policy.

7. The apparatus of claim 6, further comprising memory for storing information regarding the associated at least one parameter, the associated at least one parameter further including one or more of the following: expiration date, session duration, bandwidth, user identity, or user rewards.

8. The apparatus of claim 6, wherein the interface sends a submission including a corresponding pre-shared encryption key associated with a second unique pre-shared encryption key to the cloud database of pre-shared encryption keys for retrieval in response to a subsequent query concerning the second unique pre-shared encryption key sent by a second user device while located within range of another hotspot associated with the brand.

9. The apparatus of claim 8, wherein further execution of instructions by the processor generates the second unique pre-shared encryption key for the second user device.

10. The apparatus of claim 9, wherein further execution of instructions by the processor determines at least one parameter governing the secured communication network access to be provided to the second user device, wherein transmitted information regarding the second unique pre-shared encryption key further includes the at least one parameter.

11. A system for providing secured communication network access, the system comprising:

a hotspot controller of a first hotspot comprising an interface for:

receiving an incoming request sent over an open communication network for secured communication network access, the request initiated by a requesting user device located within a range of the first hotspot, the request including a unique pre-shared encryption key associated with the requesting user device, wherein the unique pre-shared encryption key was displayed in a web page generated by a web portal server to the requesting user device, determining there is currently no corresponding pre-shared encryption key stored at the first hotspot, wherein the corresponding pre-shared encryption key is required to decrypt communications encrypted based on the unique pre-shared encryption key associated with the requesting user device, sending a query for the corresponding pre-shared encryption key to a cloud database of pre-shared encryption keys generated at a plurality of different hotspots, the different hotspots including hotspots associated with a plurality of brands, wherein each pre-shared encryption key in the cloud database corresponds to a different pre-shared encryption key that is unique to an associated user device, the query concerning any prior use of the unique pre-shared encryption key associated with the requesting user device and included in the request, and receiving a response to the query including the corresponding pre-shared encryption key, wherein the corresponding pre-shared encryption key is unique to the requesting user device and had been generated during prior use at a second hotspot associated with the brand; and an access point associated with the first hotspot, the hotspot associated with a brand, the access point providing secured communication network access based on the unique pre-shared encryption key associated with the requesting user device and the corresponding pre-shared encryption key obtained from the cloud database, wherein encryption in accordance with the unique pre-shared encryption key associated with the requesting user device is different than encryption for any other user device in the secured communication network, and wherein the secured communication network access provided to the requesting user device is governed at least in part by at least one parameter identified as being associated with the unique pre-shared encryption key, the at least one parameter including an access policy.

12. The system of claim 11, further comprising a server for storing the cloud database of pre-shared encryption keys, the server in communication with the hotspot controller via the Internet.

13. The system of claim 11, wherein the hotspot controller further includes memory for storing information regarding the associated at least one parameter, the associated at least one parameter further including one or more of the following: expiration date, session duration, bandwidth, user identity, or user rewards.

14. The system of claim 11, wherein the interface sends a submission including a corresponding pre-shared encryption key associated with a second unique pre-shared encryption key to the cloud database of pre-shared encryption keys for retrieval in response to a subsequent query concerning the second unique pre-shared encryption key sent by a second user device while located within range of another hotspot associated with the brand.

15. The system of claim 14, wherein further execution of instructions by the processor generates the second unique pre-shared encryption key for the second user device.

16. The system of claim 15, wherein the hotspot controller further includes a processor for executing instructions stored in memory, wherein execution of instructions by the processor determines at least one parameter governing the secured communication network access to be provided to the second user device, wherein transmitted information regarding the second unique pre-shared encryption key further includes the at least one parameter.

17. A non-transitory computer-readable storage medium, having embodied thereon a program executable by a processor to perform a method for providing secured communication network access, the method comprising:

receiving a request sent over an open communication network for secured communication network access, the request initiated by a requesting user device located within a range of a first hotspot associated with a brand, the request including a unique pre-shared encryption key associated with the requesting user device, wherein the unique pre-shared encryption key was displayed in a web page generated by a web portal server to the requesting user device;

determining there is currently no corresponding pre-shared encryption key stored at the first hotspot, wherein the corresponding pre-shared encryption key is required to decrypt communications encrypted based on the unique pre-shared encryption key associated with the requesting user device;

sending a query for the corresponding pre-shared encryption key to a cloud database of pre-shared encryption keys generated at a plurality of different hotspots, the different hotspots including hotspots associated with a plurality of brands, wherein each pre-shared encryption key in the cloud database corresponds to a different pre-shared encryption key that is unique to an associated user device, the query concerning any prior use of the unique pre-shared encryption key associated with the requesting user device and included in the request;

receiving a response to the query including a corresponding pre-shared encryption key, wherein the corresponding pre-shared encryption key is unique to the requesting user device and had been generated during prior use at a second hotspot associated with the brand; and providing secured communication network access at the first hotspot based on the unique pre-shared encryption key associated with the requesting user device and the corresponding pre-shared encryption key obtained from the cloud database, wherein encryption in accordance with the unique pre-shared encryption key associated with the requesting user device is different than encryption for any other user device in the secured communication network, and wherein the secured communication network access provided to the requesting user device is governed at least in part by at least one parameter identified as being associated with the unique pre-shared encryption key, the at least one parameter including an access policy.

* * * * *